Figure 1:
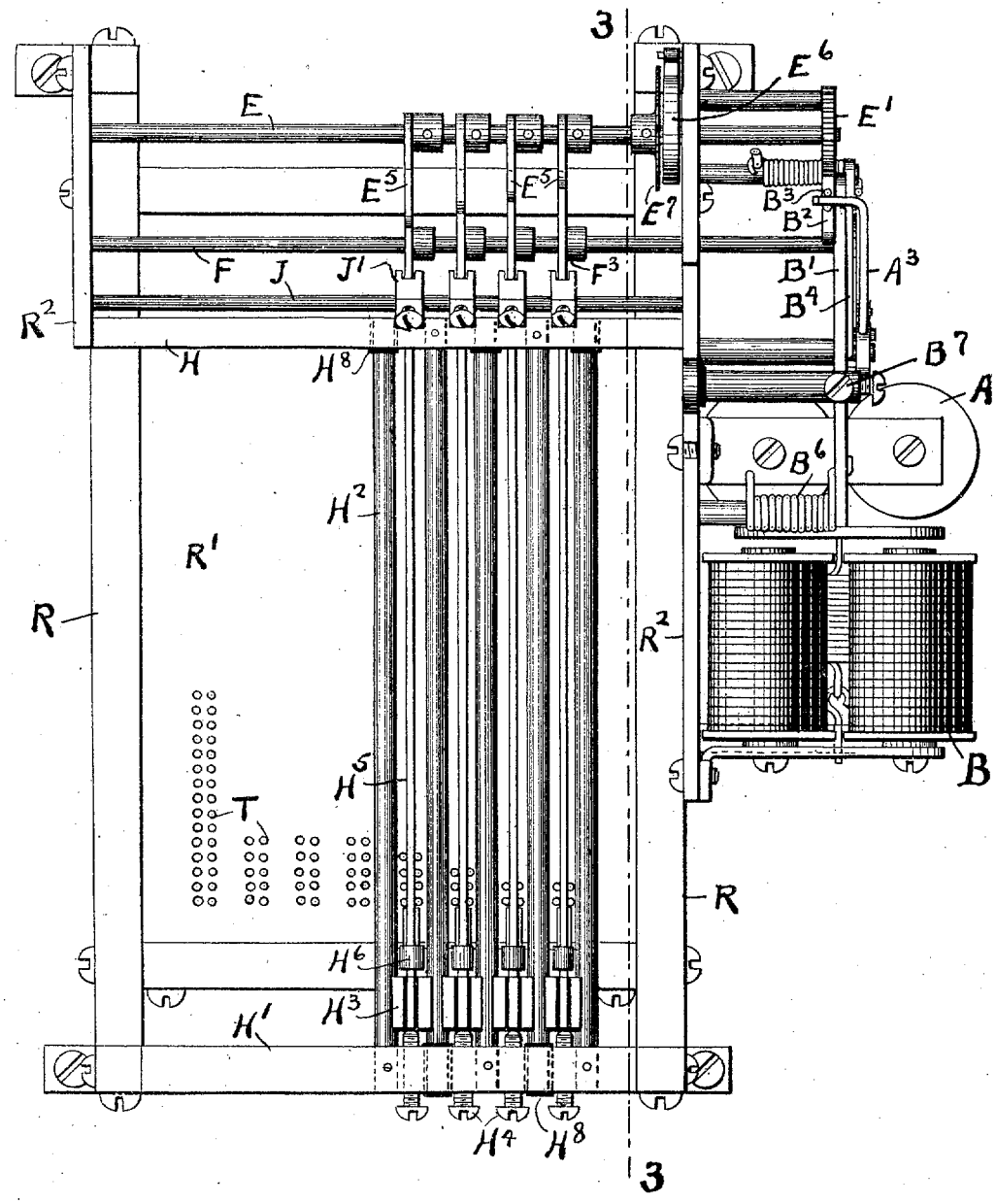

No. 857,959. PATENTED JUNE 25, 1907.
N. E. NORSTROM.
AUTOMATIC TELEPHONE EXCHANGE.
APPLICATION FILED MAY 31, 1900.

12 SHEETS—SHEET 3.

No. 857,959. PATENTED JUNE 25, 1907.
N. E. NORSTROM.
AUTOMATIC TELEPHONE EXCHANGE.
APPLICATION FILED MAY 31, 1900.

12 SHEETS—SHEET 4.

No. 857,959. PATENTED JUNE 25, 1907.
N. E. NORSTROM.
AUTOMATIC TELEPHONE EXCHANGE.
APPLICATION FILED MAY 31, 1900.

12 SHEETS—SHEET 9.

Witnesses
Howard A. Redfield
Carlos Escobar

Inventor
N. Emil Norstrom
By his Attorney
Casper L. Redfield

No. 857,959. PATENTED JUNE 25, 1907.
N. E. NORSTROM.
AUTOMATIC TELEPHONE EXCHANGE.
APPLICATION FILED MAY 31, 1900.
12 SHEETS—SHEET 10.
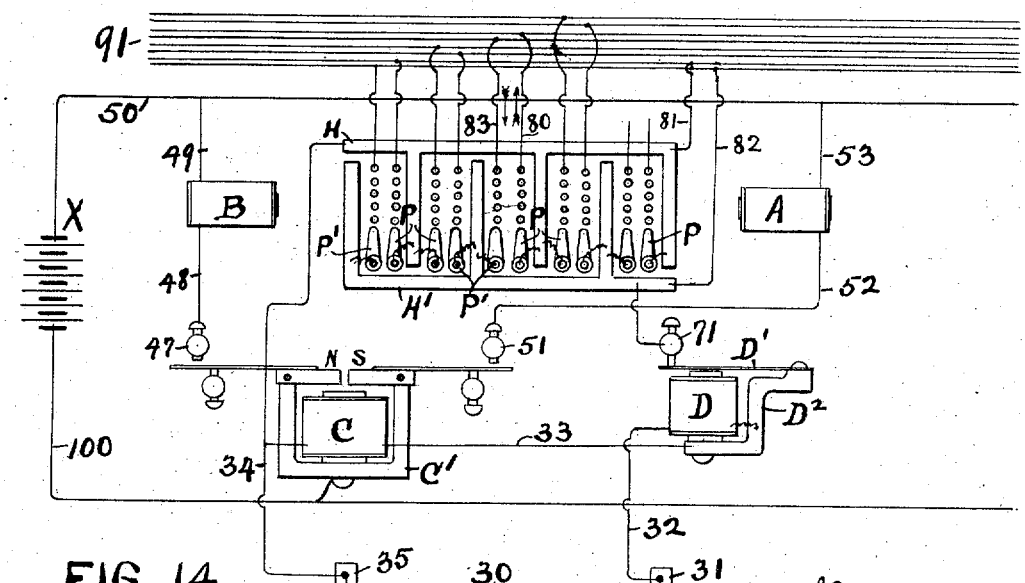
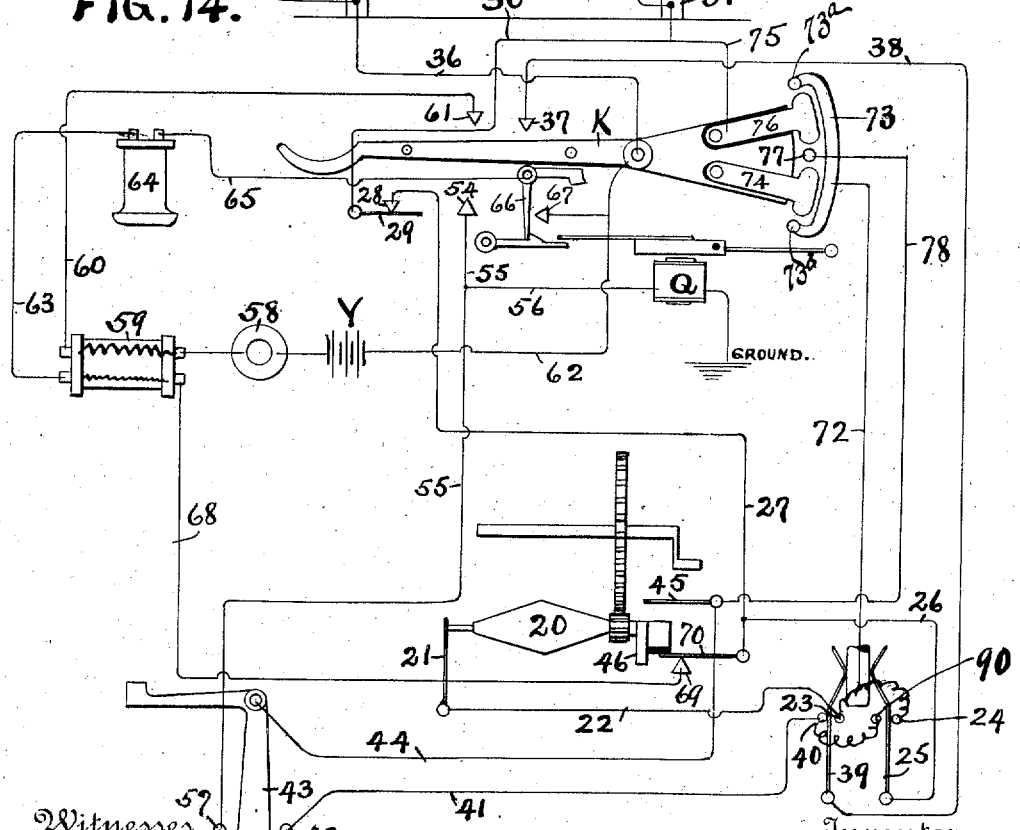
FIG. 14.
Witnesses
Howard A. Redfield
Carlos Escobar
Inventor
N. Emel Norstrom
By his Attorney
Casper L. Redfield No. 857,959. PATENTED JUNE 25, 1907.
N. E. NORSTROM.
AUTOMATIC TELEPHONE EXCHANGE.
APPLICATION FILED MAY 31, 1900.
12 SHEETS—SHEET 11.
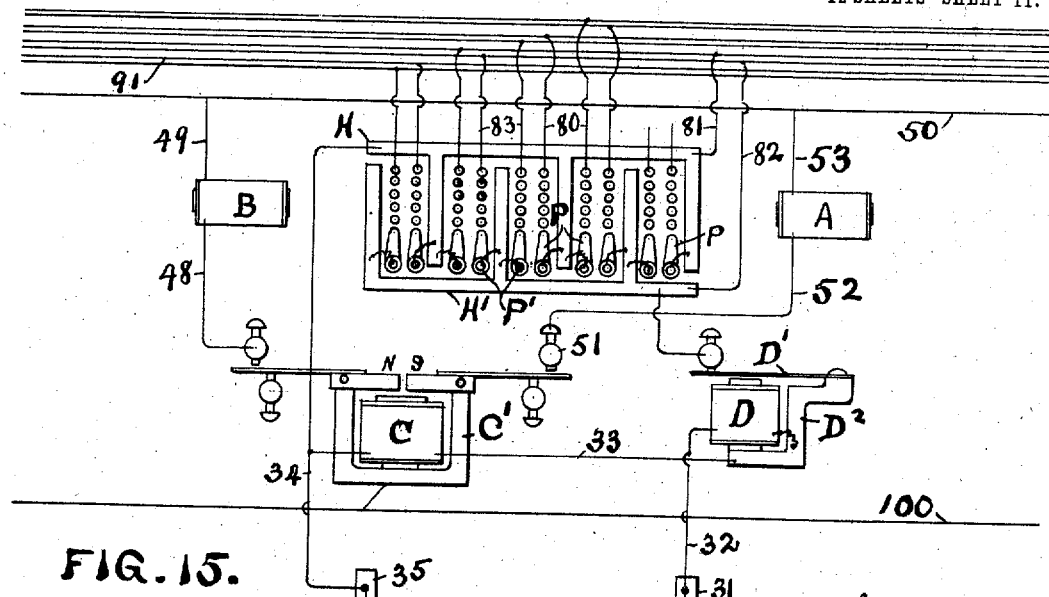
FIG. 15.
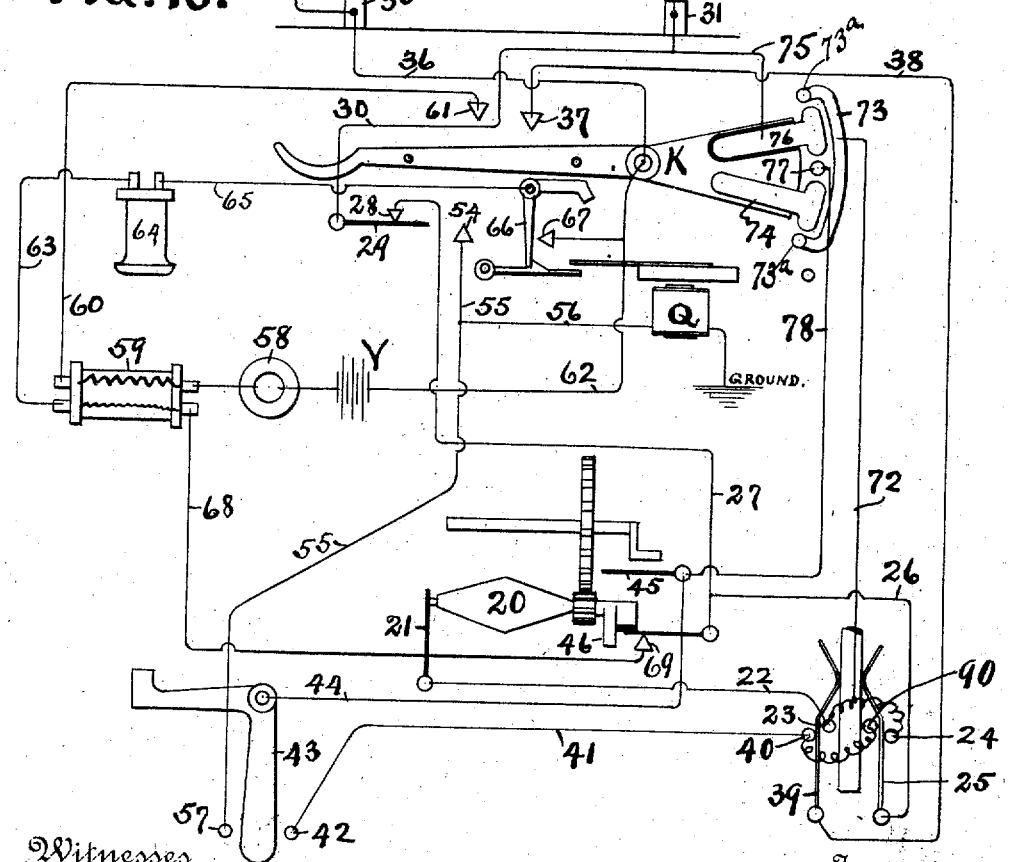
Witnesses
Howard A. Redfield.
Carlos Escobar.
Inventor
N. Emel Norstrom,
By his Attorney
Casper L. Redfield.

No. 857,959. PATENTED JUNE 25, 1907.
N. E. NORSTROM.
AUTOMATIC TELEPHONE EXCHANGE.
APPLICATION FILED MAY 31, 1900.
12 SHEETS—SHEET 12.
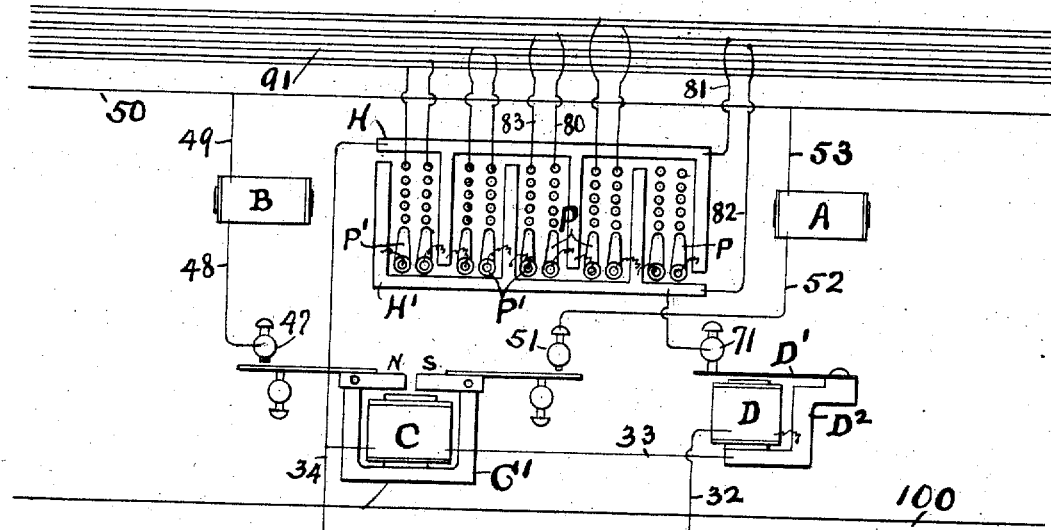
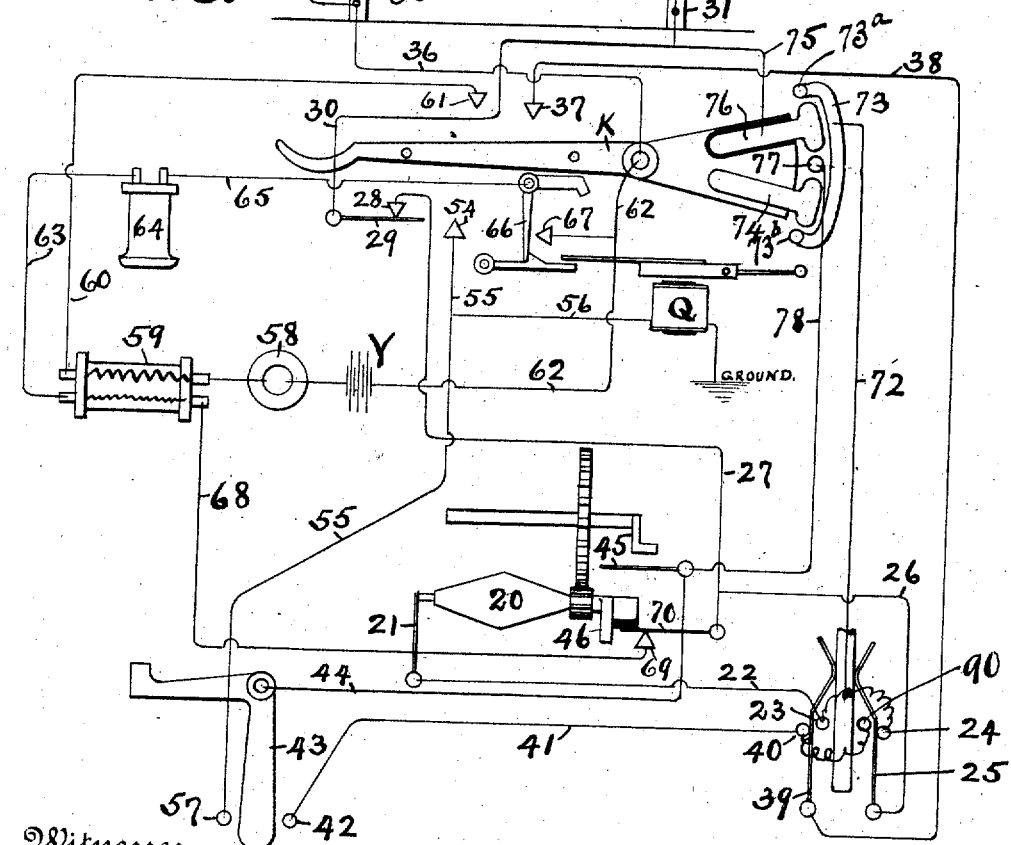
FIG. 16.
Witnesses
Howard A. Redfield.
Carlos Escobar.
Inventor
N. Emel Norstrom,
By his Attorney
Casper L. Redfield.

UNITED STATES PATENT OFFICE.

NILS EMEL NORSTROM, OF JUNCTION CITY, KANSAS, ASSIGNOR OF ONE-HALF TO JOHN ANDERSON, OF SALINA, KANSAS, AND ONE-SIXTH TO M. E. RICHARDSON, OF STERLING, KANSAS.

AUTOMATIC TELEPHONE-EXCHANGE.

No. 857,966.        Specification of Letters Patent.        Patented June 25, 1907.

Application filed May 31, 1900. Serial No. 18,519.

*To all whom it may concern:*

Be it known that I, NILS EMEL NORSTROM, a citizen of the United States of America, and a resident of Junction City, county of Geary, and State of Kansas, have invented certain new and useful Improvements in Automatic Telephone-Exchanges, of which the following is a specification.

My invention relates to automatic telephone exchanges and has for its object the construction and arrangement of devices which will simplify the process of selection; and another object of which is arrangements and construction which will reduce the cost of installation and secure perfection of operation.

There are also a number of other objects attained by my invention, which will become apparent in the detailed description.

In carrying out my invention, I arrange at each telephone an index or key-board, which is set at the required selection, after which the total operation is performed by the subscriber turning a crank. The selection itself is done automatically. By having a key-board or index which is set, if there is any error in the proper selection, the key-board will indicate whether the fault lies with the subscriber or the apparatus. By the manner in which I control the operation of the switches at the central office, it is not necessary for me to use three wires between the local station and the central office, for the purpose of securing complete metallic connections between two subscribers, nor is it necessary for me to use copper wires, as is ordinarily the case.

Figure 2:
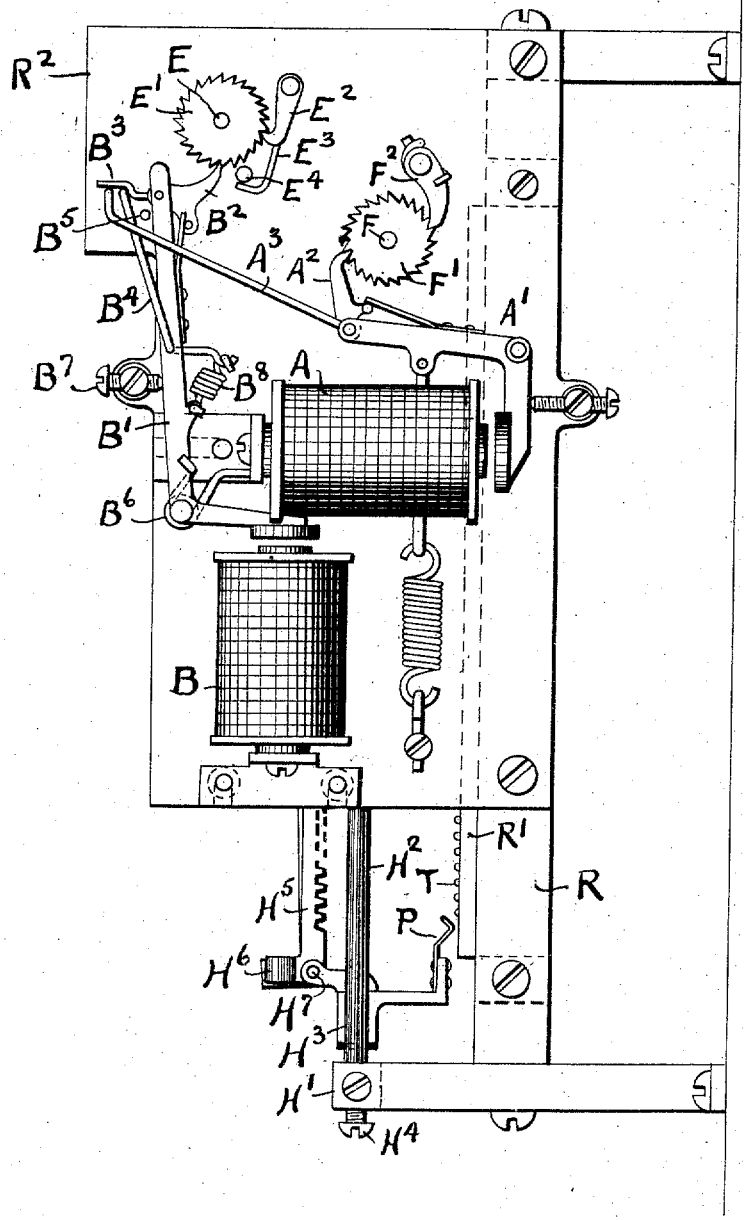
Figure 3:
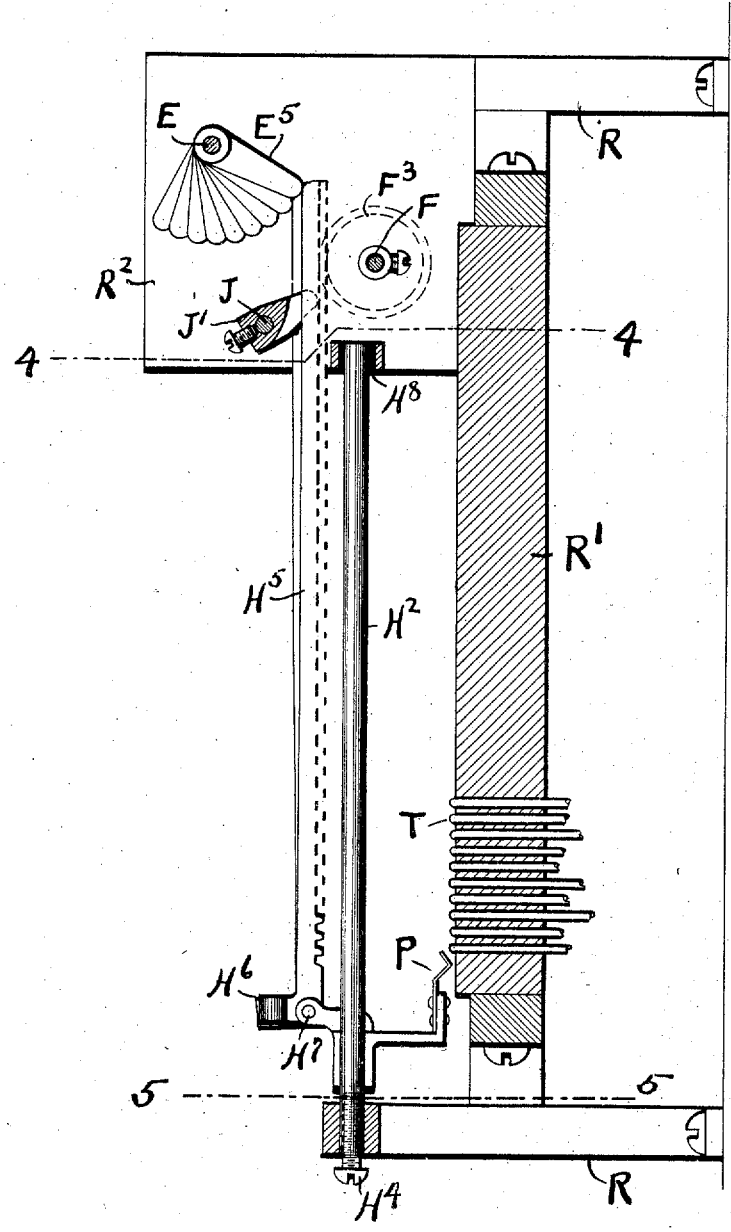
Figure 4:
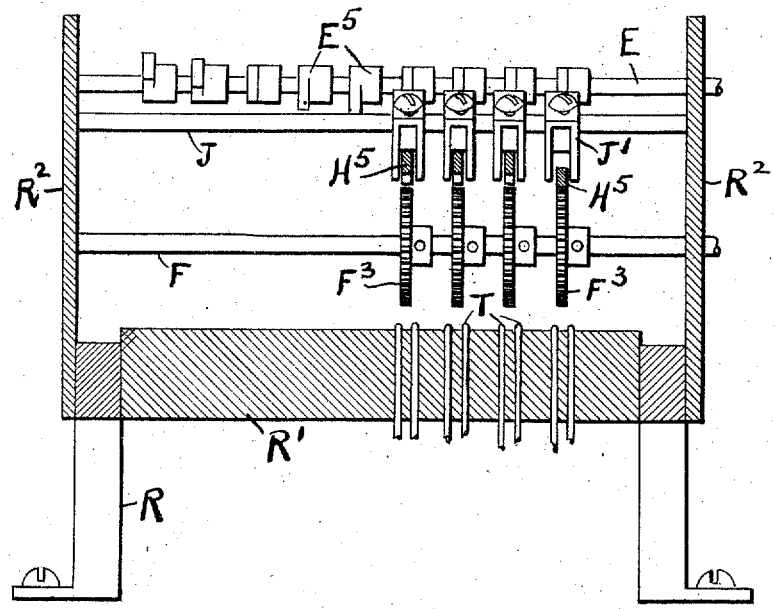
Figure 5:
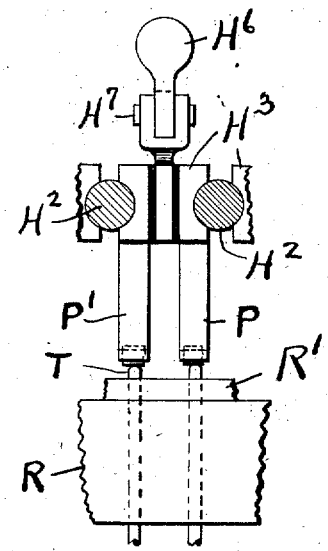
Figure 6:
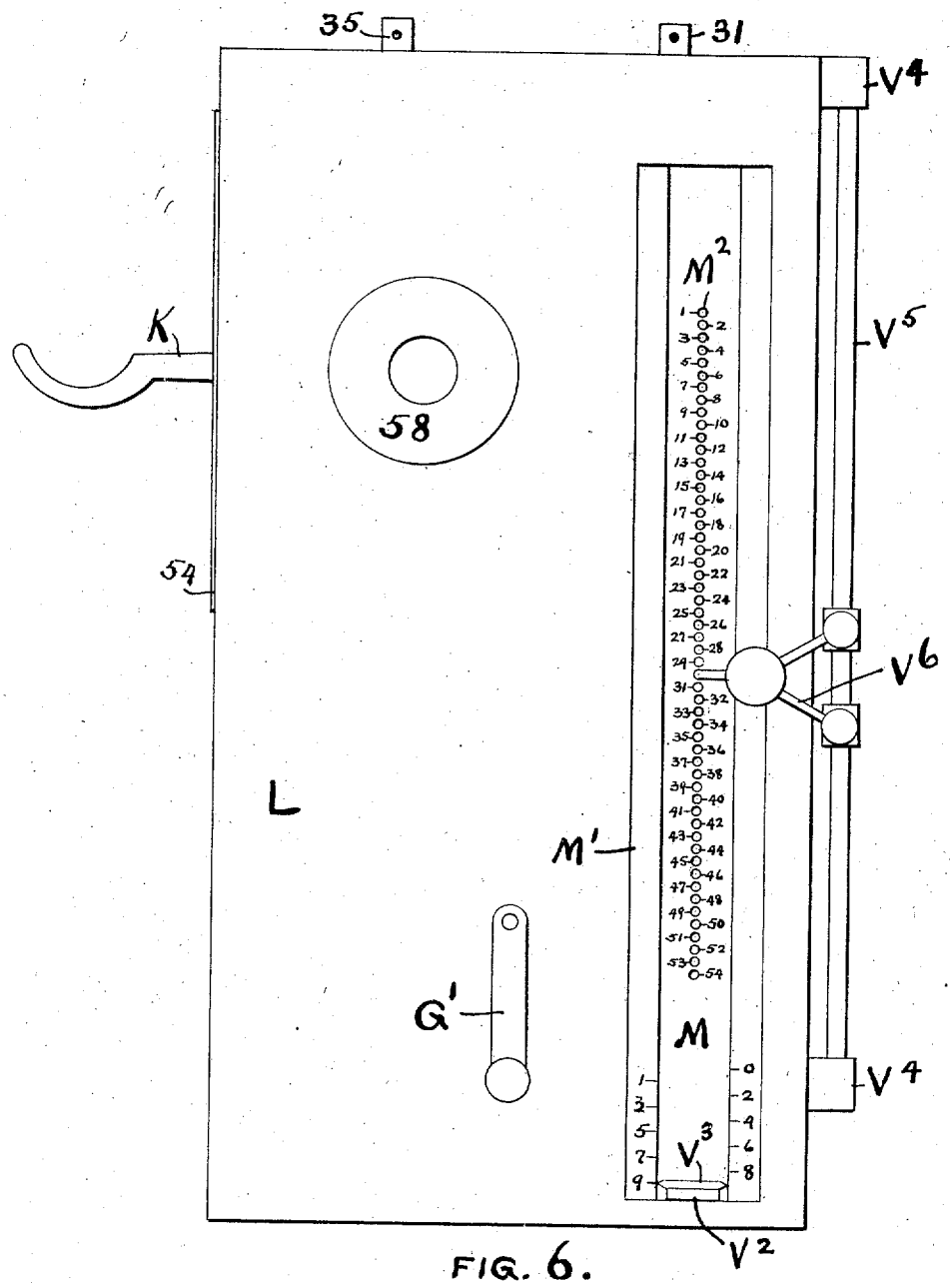
Figure 7:
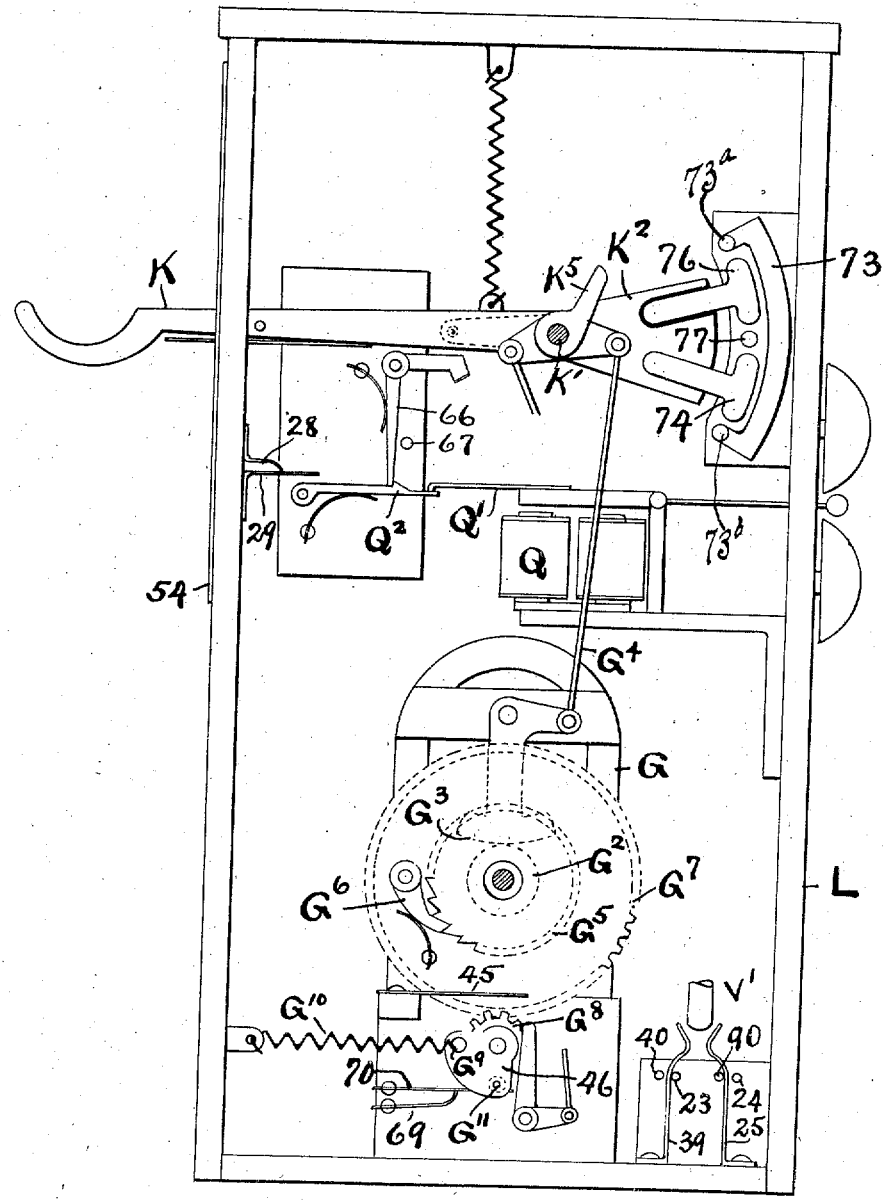
Figure 8:
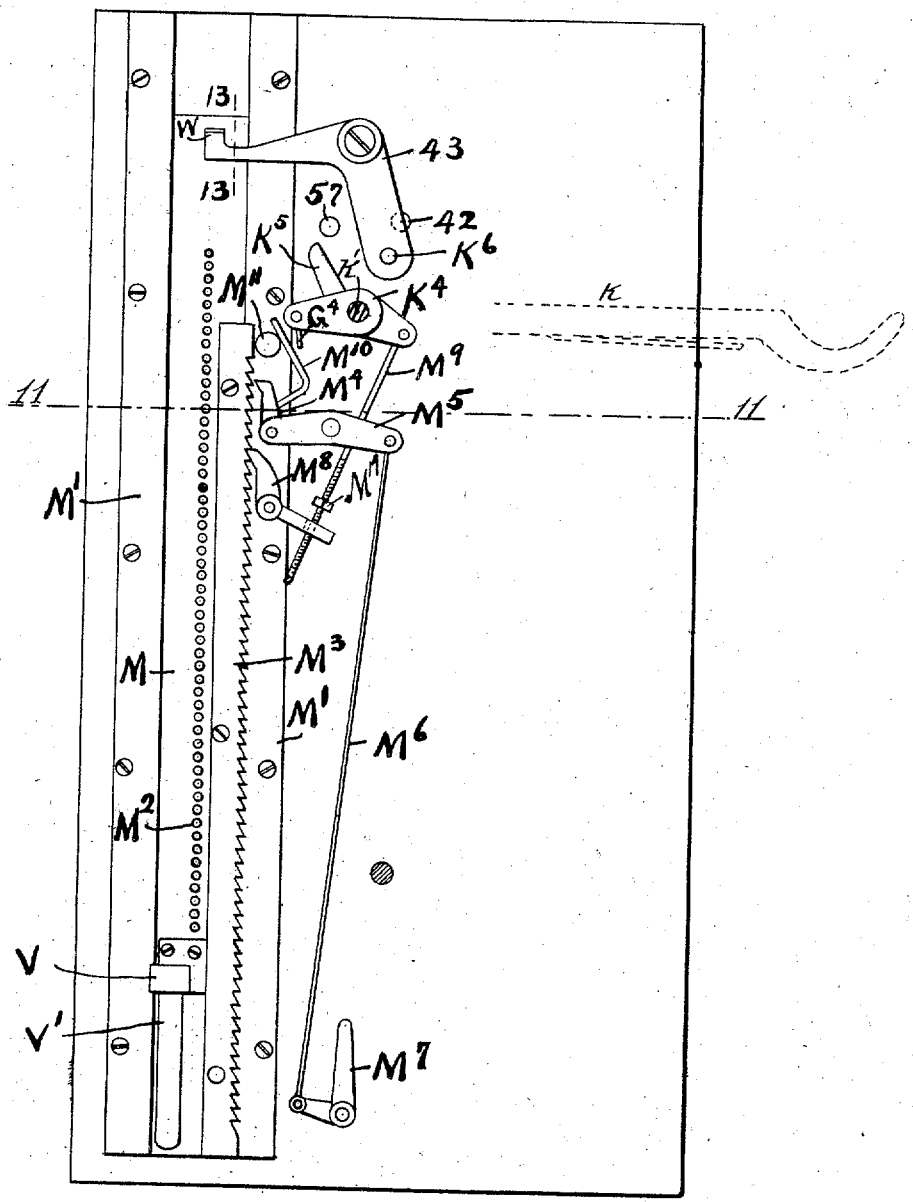
Figure 9:
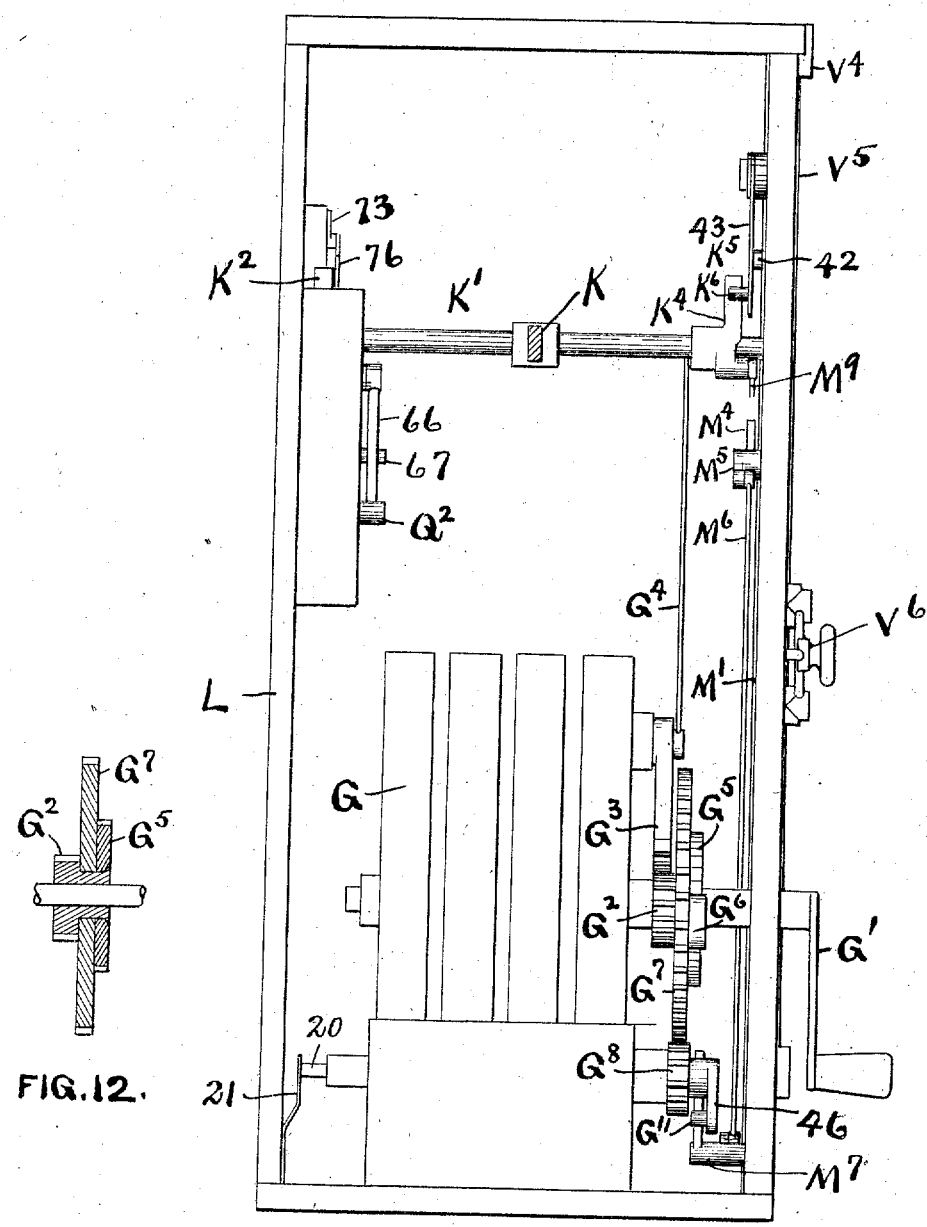
Figure 10:
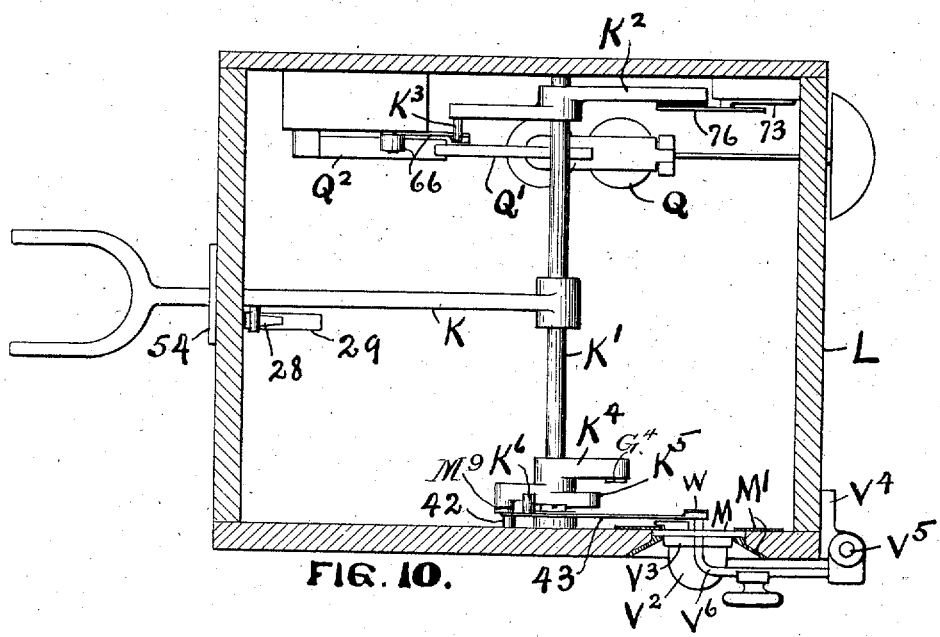
Figure 11:
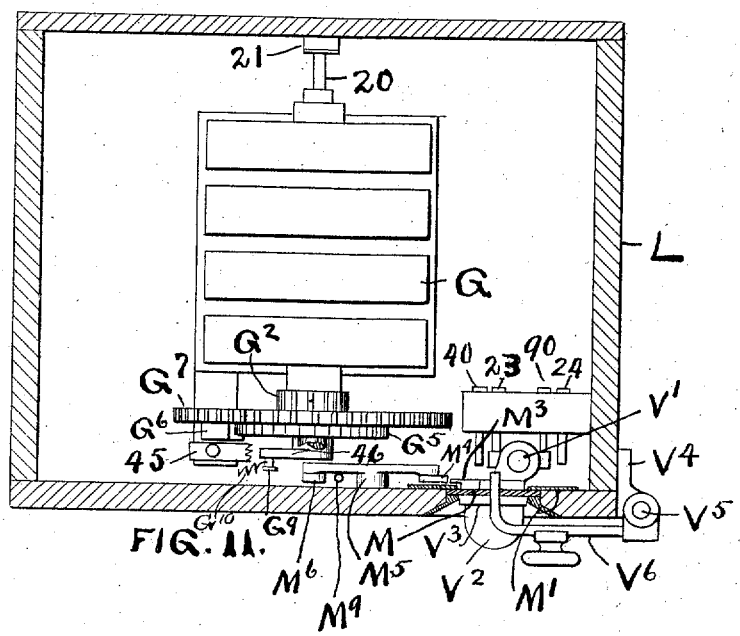

In the accompanying drawings, Figure 1 is a front elevation of one of the switch mechanisms located at the central office; Fig. 2 is a side elevation of the same; Fig. 3 is a section on line 3—3 of Fig. 1, part of the section being offset so as to show the insulation of one of the guide-rods; Fig. 4 is a transverse section on line 4—4 of Fig. 3; Fig. 5 is a partial section on line 5—5 of Fig. 3; Fig. 6 is a front elevation of one of the telephone boxes at a local station; Fig. 7 is a similar view with the front cover of the box removed; Fig. 8 is an inside view of the cover, showing parts attached thereto and some of the parts that appear also in Fig. 7; Fig. 9 is a side elevation of the box with a side removed, so that the interior mechanism may be shown; Fig. 10 is a horizontal section across the upper part of the telephone box, showing some of the upper interior mechanism; Fig. 11 is a similar section showing some of the parts in the lower part of the telephone box; Fig. 12 is a detail of some of the gears connected with the generator shown in Fig. 9; Fig. 13 is a section on line 13—13 of Fig. 8; Figs. 14, 15 and 16, taken together, are a general diagram, illustrating three switch mechanisms at the central office, together with three telephones connected thereto.

In the said drawings, R represents the framework on which is supported a block of insulating material $R^1$, in which are a series of contact points T, arranged in double rows as shown in Fig. 1, and also in the diagrams. Secured to the side of the frame R are two side-plates $R^2$, which support some of the operating mechanism. Secured to the right-hand side plate $R^2$ is a magnet A, on the armature lever $A^1$, of which, there is a pawl $A^2$ arranged to engage a ratchet wheel $F^1$ on the shaft F. The pawl $F^2$ serves to prevent a backward movement of the shaft F. Also secured on the same side-plate is a magnet B whose armature lever $B^1$ carries a pawl $B^2$ adapted to engage a ratchet wheel $E^1$ on the shaft E. The holding pawl $E^2$ prevents a return movement of the shaft E until said pawl has been released. On the pawl $B^2$ is a bent pin $B^3$ which is engaged by a pivoted wire $B^4$, as shown in Figs. 1 and 2. On the armature lever $A^1$ is a rod or arm $A^3$ which projects outward and engages the extreme end of a wire $B^3$ so that when the magnet A is operated, the rod $A^3$ will push the pawl $B^2$ out of engagement with the ratchet wheel $E^1$. When the pawl $B^2$ is so pushed, the pivoted wire $B^4$ will be drawn by spring $B^8$ into engagement with a stop-pin $B^5$, in which position the rod or wire $B^4$ will engage the outwardly projecting part of the pin $B^3$ and hold the pawl $B^2$ out of engagement with the ratchet wheel $E^1$. It will therefore be evident that if the magnet A is operated, and immediately thereafter the magnet B be operated, the last operation will not rotate the ratchet wheel $E^1$. The amount that pawl $B^2$ is pushed downward out of engagement with the ratchet wheel $E^1$ is sufficient so that when the magnet B is operated, the pawl B² will pass under the stop E⁴ and engage the wire E³ connected to the pawl E², and by that engagement will push the pawl E² away from and release the ratchet wheel E¹. When so released, the shaft E will be rotated backward to its normal position by a spring E⁶, shown in Fig. 1, adjacent to which spring is a disk E⁷ to hold the spring from displacement.

Near the upper portion of the frame R is a cross-bar H, and near the lower portion is a cross-bar H¹. Supported in these cross-bars are a series of vertical and parallel rods H², one end of each of which rods is insulated from its support, and the other end of which is in electrical connection with its support. This insulation is shown at H⁸, and the insulations are so arranged that each alternate rod is in electrical connection with the bar H, and the other rods are in electrical connection with the bar H¹. Supported between each pair of bars H² is a sliding block H³ which is divided into two parts insulated from each other, as shown in Figs. 1 and 5. Between the two parts of one of the sliding blocks H³ is a bracket or lug which extends outward and has pivoted to it a rack H⁵ which extends upward parallel to the rods H², or nearly so. Supported in the side frames R² is a shaft J, on which are a series of blocks J¹ which serve as guides for the upper ends of the racks H⁵. On the shaft F are a series of gears F³ which are arranged to engage the series of racks H⁵. On each rack H⁵, at a point near its pivot H⁷, is a weight H⁶ which acts to hold the racks H⁵ normally out of engagement with their gear wheels F³. On the shaft E are a series of arms E⁵ arranged in line with the racks H⁵, and also arranged with one in advance of another, so that the series of them takes the form of an open fan, as shown in Fig. 3. The arms E⁵ are arranged so that when the shaft E is rotated, they engage, one at a time, with the racks H⁵ and push them into engagement with their gears F³. These parts are so arranged that, by operating the magnet B, each tooth of the ratchet wheel E¹ will move an arm E⁵ into engagement with a rack H⁵, and bring said rack into engagement with its proper gear. As the ratchet wheel E¹ is moved forward step by step, succeeding arms E⁵ move succeeding racks H⁵ into engagement with their respective gears. By this means the operation of the magnet B selects any desired one of a number of such racks H⁵ by bringing it into engagement with a gear so that it will be moved upward when the shaft F is rotated. Secured on the rear faces of the sliding blocks H³ are two contact makers P and P¹. Each contact maker is in electrical connection with the part of the sliding block H³, to which it is attached, and is insulated from the other half. As the faces of a block H³ are in electrical connection with the guide rods H² on which they are guided, and as these rods are in electrical connection with the supporting cross-bars H and H¹, it will therefore be apparent that the contact makers P and P¹ are respectively in electrical connection with the cross-bars H and H¹. In the diagram, contact makers in electrical connection with the cross-bar H have been marked P, and those in electrical connection with the cross-bar H¹ have been marked P¹. These contact makers P and P¹ are arranged so that when the connected rack is moved upward step by step by operation of the magnet A, said contact makers will engage successive pairs of contact points T.

It will be apparent from the description so far given that by operating magnet B, any desired pair of contact makers P and P¹ may be selected and that by operating magnet A the selected contact makers may be moved upward any required distance to select any required pair of contact points in the corresponding vertical row of contact points. It will also be apparent that after having operated magnet B and then magnet A, if magnet B be again operated the pawl B² will release the pawl E², so that the shaft E will be returned to its normal position by the spring E⁶. This return of the shaft E moves the engaging arm E⁵ away from the engaged rack H⁵, when the weight H⁶ tips the moved rack outward from engagement with its gear F³, when said rack will fall by gravity to its normal position, which normal position is determined by a series of set screws H⁴, against which the blocks H³ rest in their lowest position.

On the front cover of the telephone box is arranged a slide M which is vertically movable in guides M¹. In the said slide are a series of small holes M², which are numbered consecutively from 1 to any required number, according to the length of the slide M, which length is determined by the number of holes required. On the lower front portion of the slide M is a projection V², by which the vertical position of the slide M may be adjusted by hand. Adjacent to the projection or lug V² is a pointer V³, and on the front face of the outer guides M¹ are a series of graduations marked from 0 to 9, as illustrated in the lower right-hand portion of Fig. 6. At its lowest or normal position, the pointer or indicator V³ points at the graduation marked 9. Inside of the telephone box is the ordinary generator G, which may be rotated in the ordinary manner by crank G¹ on the front of the telephone box. On the crank shaft of the said generator is a small gear G², which is engaged by a segment of a larger gear G³, pivoted to a bracket on the generator G. Secured on a hub of the gear G² is a ratchet wheel G⁵ and loosely supported on said hub, between the gear G² and ratchet G⁵, is a large gear G⁷, which engages a gear G⁸ on the armature of said generator. Pivoted on the gear G⁷ is a pawl G⁶ arranged to engage with the ratchet G⁵, so that when said ratchet is turned in one direction, said turning will cause a rotation of the gear G⁷, and consequently of the armature of the generator. When, however, the crank is turned in an opposite direction, the ratchet wheel G⁵ will pass under the pawl G⁶, and as a consequence the armature of the generator will not be rotated. On the armature shaft is a segment of a disk 46 on which there is a pin G⁹, to which is connected a spring G¹⁰, tending to hold the armature of said generator in a given position. When the crank G¹ is rotated clock-wise, the ratchet wheel G⁵ drives the gear G⁷, which in turn drives the gear G⁸, and consequently the armature of the generator. If, however, the speed of rotation is not sufficient to generate a current, the tension of the spring G¹⁰ will accelerate the movement of the armature during the last half of the rotation to a speed sufficient to cause a proper current to be generated. This acceleration is permitted by reason of the fact that when the crank is turned clock-wise, the ratchet wheel G⁵ is driven as fast as the crank, but the gear G⁷ may move faster by the pawl G⁶ riding over the ratchet wheel if the tension of the spring G¹⁰ is sufficient to cause it to do so. If, however, the rotation of the crank G¹ by hand is of speed sufficient to cause a proper generation of a current, the spring G¹⁰ does not act to accelerate the speed of the armature. The spring G¹⁰ therefore acts to stop the armature at a given position, when the crank is not being rotated, and also to produce a certain required speed of the armature of the generator at a certain required portion of its rotation. Secured on the rear face of the disk 46 is an insulated pin G¹¹, which, in its normal position, engages a contact spring 70 and pushes it into electrical connection with another spring 69. When, however, the armature is rotated the pin G¹¹ passes out of engagement with the spring 70 and permits it to break its electrical connection with the spring 69. Insulatingly secured to the generator frame is a contact spring 45, which is engaged by disk 46 at one portion of its rotation so as to make electrical connection between the two at that particular time, but to break such electrical connection at other portions of the rotation. Pivoted on the front cover is a bell crank lever M⁷, which is engaged by pin G¹¹ at one portion of the rotation of the armature of the generator. This engagement causes a vibration of the bell crank lever M⁷ on its pivot. Secured at a suitable point on the cover of the telephone box is a lever M⁵ which carries a pawl M⁴ adapted to engage a ratchet bar M³ secured on slide M. The lever M⁵ is connected by a rod M⁶ to the bell crank lever M⁷, so that when the lever M⁷ is engaged by pin G¹¹, the vibration of the lever M⁷ will cause the same vibration of the lever M⁵, the result of which is to cause the pawl M⁴ to engage the ratchet M³ and move it upward one tooth. The pawl M⁸ serves to hold said ratchet M³, and consequently the connected slide M, from a downward movement until the said pawl M⁸ is released as will hereinafter be described. On the pawl M⁴ is a bent wire M¹⁰, which engages a post M¹¹ in such a manner that when the lever M⁵ is at its normal position, as shown in Fig. 8, the pawl M⁴ is out of engagement with the ratchet M³.

The receiver hook K is secured to a shaft K¹, on which shaft is also secured an arm K², one end of which carries a pin K³. Secured on a block at the side of the telephone box, and in the path of the pin K³, is a bell crank lever 66, the horizontal arm of which is flexible, and the outer end of which has a curved lip of the same character as that illustrated in another similar piece in Fig. 13. This horizontal arm is so arranged that when the receiver is hung upon the hook K, the pin K³ will engage the upper edge of the horizontal arm of 66 and press it downward, while upon the rising of the hook K the pin K³ will engage the curved lip and press the horizontal arm to one side, thereby passing the horizontal arm without moving the vertical arm from its position. Located at a convenient place in the telephone box is a bell ringer Q, on the armature of which is an arm Q¹ adapted to engage the end of a catch Q² that engages and holds the bell crank arm 66 in the position shown in Fig. 7. Adjacent to the arm 66 is a contact point 67. These parts are so arranged that upon the operation of the bell ringer Q, the arm Q¹ will strike the catch Q², releasing it from the arm 66, when said arm will be forced, by the spring, back into contact with the contact point 67. If, after this operation has taken place, the receiver be hung upon the receiver hook K, the pin K³ will engage the upper portion of the horizontal arm of 66, pressing it downward and thus pressing the vertical arm back so it will again be caught by the catch Q² and be held away from the contact point 67. On the other end of the arm K² are supported an insulated contact spring 76 and another contact spring 74, which is in electrical connection with the arm K², and consequently with the shaft K¹, and the receiver hook K. Adjacent to, and in the path of the contact springs 74 and 76, is a strip 73, having contact points 73ᵃ and 73ᵇ at its two ends, as shown in Fig. 7. Midway between the two contact points on the metallic strip 73 is an insulated contact point 77. In Fig. 7 the hook K and the contact springs 74 and 76 are shown in their mid position. When the receiver is on the hook K, the contact spring 74 is in the position in which 76 is shown, and 76 is in a position above the contact point on the upper end of 73. When the receiver is removed from the hook K, the contact spring 76 is in the position of contact spring 74, as shown in Fig.

7, and the contact spring 74 is below the contact point on the lower end of 73. It will therefore be evident that, in the movement of the receiver hook from the upper extreme to the lower, the contact spring 76 will engage the contact point 77, and at the same moment the contact spring 74 will engage the lower contact point on the strip 73. In the passing downward of the receiver end of the hook K, these springs will pass upward over these points, then pass out of connection with them into the position shown in Fig. 7, and following this the contact spring 74 will engage the contact point 77, while at the same time the contact spring 76 will engage the upper contact point on the strip 73, after which, further movement will cause these strips to pass out of engagement with the said contact points. Also located on the shaft $K^1$ is another metallic piece $K^4$, having two arms nearly horizontal, and the third arm $K^5$ projecting upward. One of the horizontal arms of $K^4$ is connected by $G^4$ to an arm of the gear segment $G^3$, so that when the receiver is placed upon the receiver hook K, the said segment will be moved so as to turn the gear $G^2$ and consequently the ratchet wheel $G^5$ and the gear $G^7$, the result of which is to give the armature of the generator G two rotations. When the receiver hook K rises, by reason of removing the receiver, the segment $G^3$ rotates the gear $G^2$ and ratchet wheel $G^5$ in the opposite direction, in which case the ratchet wheel moves under the pawl $G^6$ and the armature is not rotated. It will therefore be apparent that when the receiver is placed upon the hook K, the result is to give the generator two rotations, making two electrical connections between 46 and 45, while on the other hand, the rising of the hook K, due to the removing of the receiver, does not in any way affect the armature of the generator. The segment $G^3$ is so related to its movement that when the receiver hook K is at its lowest or at its highest position, the said segment is free from the gear $G^2$, and consequently the said gear and the armature of the generator may be rotated without interfering with the segment $G^3$ or the hook K. The other horizontal arm of the metallic piece $K^4$ is provided with a rod $M^9$ which passes through a tail-piece on the holding pawl $M^8$. On the rod $M^9$ is an adjusting nut $M^{13}$ which may be set at any required position. These parts are so arranged that upon the descent of the hook K, by reason of the receiver being placed upon it, the rod $M^9$ will descend so that the nut thereon will engage the tail-piece on the pawl $M^8$, thereby releasing said pawl from the rack $M^7$ so that said rack, and the slide M to which it is connected, may fall by gravity to its normal position. Located on the cover of the telephone box, near its upper portion, is a bell crank lever 43, the horizontal arm of which is flexible and reaches outward into the path of the holes $M^2$ in slide M. The end of the horizontal arm of the bell crank 43 is provided with a lip W, which is given a curve, as shown in Fig. 13. The other end of the bell crank 43 is arranged so as to engage either of two contact points 42 and 57 which are secured to the cover of the telephone box. On the lower end of the bell crank 43 is a pin $K^6$ that lies in the path of the arm $K^5$ on the metallic piece $K^4$.

Secured near one corner of the telephone box are two brackets $V^4$ in which is supported a vertical shaft or rod $V^5$. Loosely mounted on the shaft $V^5$ is an arm $V^6$, the free end of which constitutes a pin adapted to be inserted into any one of the series of holes $M^2$ in the slide M. When the pin is thus inserted into one of the holes $M^2$, it projects through so that when the slide M is moved upward, the said pin will engage the lower part of the horizontal arm of the bell crank 43, moving it upward and shifting the other arm from the contact point 42 to contact point 57. When the receiver is placed on the hook K, the movement of the arm $K^5$ engages the pin $K^6$ on the bell crank 43 and moves the said bell crank from contact point 57 to the contact point 42. When the pin $V^6$ passes above the horizontal arm of the bell crank 43, and in the downward movement of the said pin, due to the falling of the slide M by gravity, said pin will engage the curved part W of said bell crank, pushing it outward and passing below it without otherwise disturbing said bell crank 43. Secured to a convenient place on the lower portion of the slide M is a bracket V, to which is secured an insulated plug $V^1$. Secured to the bottom of the telephone box, and in the path of the plug $V^1$, are two contact springs 25 and 39, so arranged that the plug $V^1$ may enter between them and press them back. In their normal position the springs 25 and 39 are in contact with contact points 90 and 23; but when the plug $V^1$ enters between the said springs 25 and 39, it will push them out of engagement with the contact points 90 and 23 into electrical connection with the contact points 24 and 40. These springs, their contact points and the plug $V^1$, constitute a current reversing switch, the use of which will appear in the description of the circuits hereinafter to be given. The location of the plug $V^1$ with respect to the springs 25 and 39, and also with respect to the pointer $V^3$ on the front of the slide, and the graduations on the guides adjacent thereto, is such that the plug $V^1$ emerges from between the springs 25 and 39 immediately after the pointer $V^3$ rises above the graduation marked "0." The upper hole $M^2$ in the slide M is so related to the bell crank 43 and to the movement of the plug $V^1$ in the springs 25 and 39, that immediately upon the emergence of said plug from engagement between the springs 25 and 39, the pin V⁶, if located in the upper hole M², will engage the bell crank 43 and shift it from connection with 42 to 57. These various parts are arranged for hundreds and units. The pointer V³ and the graduations which are adjacent thereto represent hundreds, and the holes in the slide represent units. For example, the position shown in Fig. 6 illustrates the key-board or indicator set for 930. That is, the pointer V³ is set at 9 and the pin V⁶ is set at 30. In this position, when the slide M is moved upward by virtue of rotations of the generator, nine electrical contacts will be made between 46 and 45 before the plug V¹ emerges from between the springs 25 and 39, and following this there will be thirty contacts between 46 and 45 before the pin V⁶ engages the bell crank 43, and moves it from contact point 42 to contact point 57. If the slide M be moved upward by hand, so that the pointer V³ will be adjacent to some other graduation, then the number of contacts made before the plug V¹ emerges from between the springs 25 and 39 will be correspondingly reduced and will be equal to the number indicated on the graduation. If the pin V⁶ be placed in some other hole, than that numbered thirty, the number of contacts made after the time of the plug V¹ leaving the springs 25 and 39 will be correspondingly greater or less according to the position in which the pin V⁶ is placed.

At a convenient place in the front of the telephone box L are two springs, 28 and 29, and on the receiver hook K is a pin or projection adapted to engage the spring 29. When the receiver hook is in its elevated position these springs are in electrical connection with each other, but when the hook descends it strikes the spring 29 and breaks this connection.

In arranging a telephone exchange, I place in a central office a series of switches like that shown in Figs. 1 and 2, and to each switch I connect at elephone. The switches are preferably located in a row, and near the switches I arrange a bank of wires 91, and from each pair of wires 91 I run branch wires to pairs of contact points on the different switches. Also next, or adjacent, to each switch I locate a relay magnet C and a second and smaller magnet D. The magnet C is arranged with two armatures which have their ends polarized, as shown at N and S, representing north and south poles of the magnetized armatures. The relay D is an ordinary one arranged to operate with a very light current and is connected electrically to the generator in the connected telephone. It is also made with a sufficient resistance to prevent short circuiting the talking circuit which passes through lines 34 and 32 as will be hereinafter explained. When a current from the generator is sent through the relay C in one direction, it attracts the armature which has its north end adjacent to the pole of the relay, and when a current is sent in an opposite direction through the relay, it attracts the armature which has its south end adjacent to the pole of the relay. Connected to these two armatures N and S of the relay C, are two contact closing devices, one of which is connected to the magnet B of the switch, and the other of which is connected to the magnet A. It will therefore be apparent that if a current be sent through the relay C in one direction an electrical connection will be made through which a current may pass through the magnet B, while if a current be sent through the relay C in the opposite direction a contact will be made by which an electrical current may be made to pass through the magnet A. There is located at a convenient place in the central office a battery X, from one side of which battery a wire 100 extends with branch connections to the frame C¹ of the magnet C of each switch in the exchange. It is to this frame C¹ that the armatures N and S are pivoted, so that when a current passes to the frame C¹, it may pass through either contact closing device to either contact point 47 or 51, and thus to either magnet B or magnet A. From the other side of the battery X a wire 50 extends through the exchange with branches to magnets B and A on each switch. The magnet D is arranged to operate under a very light current and has its armature D¹ adjusted very close to the pole of the magnet, and said armature is part of the electrical circuit which passes through the magnet D and through the contact point 71. The talking circuit passes through the magnet D, but is not powerful enough to operate it. If, however, any other electric current, as for example a current from the generator G, passes through the magnet D it will be sufficiently powerful to actuate such magnet and break the connection between D¹ and 71, so that a current passing through the magnet D cannot pass by way of D¹. From contact point 71 the wire extends to the bar or support H¹ of the switch, and from the magnet D a wire 32 extends to a binding-post 31 on the telephone box of the telephone which belongs to that particular switch. From the bar or support H of the switch a wire 34 extends to a binding-post 35, also on the same telephone box. From the wire 34 there is a branch to the relay C, and from the relay C a connection 33 to the magnet frame D². The various contact points in the telephone box, most of which have been described, and all of which will be apparent by examining the diagrams in Figs. 14, 15 and 16, are connected up by wires in the manner illustrated in said diagram.

Assuming that a subscriber wishes to call another subscriber, he first sets the pin V⁶ into a hole representing the number of units which are in the number representing the subscriber whom he desires to call. He then removes his receiver and adjusts the slide M so that the pointer $V^3$ is opposite the number of hundreds of the subscriber whom he wishes to call. He then turns his crank $G^1$ until the bell rings. He then has electrical communication with the subscriber with whom he desires to talk, and said subscriber has been duly notified. The operation of removing his receiver, setting his indicator, and turning the crank $G^1$, are all the operations that he performs in calling any given subscriber in the exchange. All the other operations are automatic, and are as follows:—Upon turning the crank of his generator, said generator is not in electrical connection with any line except at the moment when the disk 46 engages the contact spring 45. As this point is always at a given portion of the rotation of the generator shaft, a current sent from the generator is always in one direction from the armature, and to the line beyond contact spring 45. Upon each connection between 46 and 45, a current flows from generator as follows:—20— 21— 22— 23— 24— 25— 26— 27— 28— 29— 30— 31— 32— D— $D^2$— 33— C— 34— 35— 36— K— 37— 38— 39— 40— 41— 42— 43— 44— 45— 46— 20. This is a complete circuit in one direction through the relay C, which causes said relay to attract the armature N, closing connection between $C^1$ and 47, when a current flows as follows:— X— 100— $C^1$— 47— 48— B— 49— 50— X. The operation of the magnet B rotates the shaft E, bringing the first arm $E^5$ into contact with the first rack $H^5$ and moving said rack into contact with its gear $F^3$. Each succeeding rotation of the generator causes a similar impulse from said generator to be sent through the relay C, which in turn causes a similar operation of the magnet B, moving successive racks to engagement with their respective gears. This operation is continued until the plug $V^1$ passes out of its engagement with the springs 25 and 39, after nine impulses representing hundreds have been sent to central, when said springs move into connection with the contact points 23 and 90. When that occurs, the current then flows 20— 21— 22— 23— 39— 38— 37— K— 36— 35— 34— C— 33— $D^2$— D— 32— 31— 30— 29— 28— 27— 26— 25— 90— 40— 41— 42— 43— 44— 45— 46— 20. This is an electrical impulse sent in an opposite direction through the relay C, which attracts the armature S, making electrical connection with the contact point 51, when a current flows as follows:—From battery X— 100— $C^1$— S— 51— 52— A— 53— 50— X. This energizes magnet A and rotates the shaft F and the gears $F^3$ so as to move upward the rack $H^5$ which is in engagement with its gear.

This moves the contact makers P and $P^1$ upward step by step to succeeding contact points in rows of contact points. When the slide $M^1$ has been moved upward far enough, by repeated rotations of the generator 20, so that thirty impulses have been sent the pin $V^6$ will engage the bell crank 43 and shift it from contact point 42 to 57, then the current from the generator is shifted from relay C to ground through a bell ringing device as follows:— (Fig. 14) — 20— 21— 22— 23— 39— 38— 37— K— 36— 35— 34— H— P— to the selected contact point, —80— to the bank wire 91 and along the connected wire to the branch—81 — (Fig. 16) therefrom, to the bar H of the selected switch— 34— 35—36— K— 54— (hook of called switch being down) 55— 56— Q— ground at the called telephone to ground at calling telephone— Q— 56— 55— 57— 43— 44— 45— 46— 20. This operates the ringer of both telephones, which operation causes the arm $Q^1$ to release the catches $Q^2$ and permit the bell cranks 66 to be moved into electrical connection with the contact points 67. The called subscriber removes his receiver when a primary circuit is as follows:—Y— 58— 59— 60— 61— K— 62— Y. The secondary or talking circuit is as follows:—59— 63— 64— 65— 66— 67— 62— K— 36— 35— 34— H— P to the selected contact point, 80, 91 to 81— H of the called switch— 34— 35— 36— K— 62— 67— 66— 65— 64— 63— 59— 68— 69— 70— 27— 28— 29— 30— 31— 32— D— $D^2$— $D^1$— 71— $H^1$— 82— to the line 91 and thence back to 83 of the calling switch— $P^1$— $H^1$— 71— $D^1$— $D^2$— D— 32— 31— 30— 29— 28— 27— 70— 69— 68— 59.

To release, the subscribers hang up their receivers. At the calling station the descent of the receiver hook causes the rod $M^9$ to engage the tail of the pawl $M^8$ and release it from the rack $M^3$ which permits the said rack and the slide M to drop again to their normal position. The descent of the hook also causes the arm $K^5$ to engage the pin $K^6$ and move the bell crank 43 from contact point 57 back to its normal position into engagement with the contact point 42. The descent of the receiver hook in moving the arm $K^4$ also moves, through the connection $G^4$, the segment of a rack $G^3$, which movement causes the generator armature to make two rotations during the time when the hook is descending. At the same time during the descent of the hook, and while the generator is being thus given two rotations, the contact springs 74 and 76 make contact with 73 and 77, which first result in a current as follows at the instant when the disk 46 engages the spring 45:—20— 21— 22— 23— 72— 73— 74— K— 36— 35— 34— C— 33— $D^2$— D— 32— 31— 75— 76— 77— 78— 45— 46— 20. This current through C attracts the armature S and makes an electrical circuit from battery X through the magnet A precisely as has been previously described. Immediately thereafter during the further descent of the hook, and at the instant when the disk 46 engages the spring 45 in the second rotation of the generator, this previously described current through C is reversed as follows:—20— 21— 22— 23— 72— 73— 76— 75— 31— 32— D— D²— 33— C— 34— 35— 36— K— 74— 77— 78— 45— 46— 20. The reversal of the current through the relay C closes the connection of the magnet B when a current flows through that magnet from the battery X as has been previously described. This current through magnet A immediately followed by a current through the magnet B causes the pawl B² to strike the pin E³ on the pawl E², and release said pawl from the ratchet wheel E¹, so that the spring E⁶ may return the arms E⁵ to their normal position, which in turn releases the moved rack, and permits it, and the contact makers P and P¹, to drop again to a normal position. Also in the descent of the receiver hook the pin K³ engages the upper portion of the bell crank 66, pushing it downward until said pin passes out of engagement with said arm, which movement of the bell crank causes it to be moved away from contact point 67 and to be engaged and held by the catch Q².

It will be observed that the operations of calling a subscriber are very much simplified and are arranged so that there is a small chance of error. By using a key-board or indicator which is set for any required subscriber, and which may be observed by the calling subscriber before he operates his generator, the chances of error rising from selecting numbers during the process of calling is eliminated. As soon as he has set his indicator or key-board and is satisfied that it is at the right indication, the only operation required of him is to turn the generator crank G¹ until the bell of his generator rings. While turning the crank G¹ the slide M and the pin V⁶ are moving upward directly before his eyes. By reason of the termination of the teeth of the ratchet bar M³ after the slide is moved up a certain distance, which would be equal to the greatest number of indicating marks on the slide M, further rotations of the generator will not raise slide and the pin V¹. The upward movement of the said slide does not stop at the instant that the proper connection is made to the required telephone but proceeds upward until the end of the ratchet M³ is reached or until the subscriber stops turning the crank G¹. The bell, however, begins to ring the instant the proper connection is made to the required subscriber because, upon that connection being made, the pin V⁶ moves the bell crank 43 from connection to its switch mechanism to connection with the bell ringing device, so that the bell rings immediately. From this it will be apparent that if the subscriber, in turning his crank, observes that his indicating slide M no longer advances upward and the bell has not rung at the time when it stops, it will indicate to the calling subscriber that the one to whom he wishes to talk is busy. The reason for the bell not ringing is as follows: It will be observed by the diagram that a current passing to the bell ringer Q must go by contact point 54 through the hook K, or by contact point 57 through the bell crank 43. At the calling telephone the subscriber has removed his receiver, so that the connection between K and 54 is broken. He therefore can reach the bell ringing device only when the bell crank 43 is moved to 57, which, as has been previously shown, occurs when the pin V⁶ reaches the said bell crank. In the called telephone the bell crank 43 is not moved, but the subscriber's receiver hook is down in its normal position if he is not busy, in which case a current passes to the called subscriber through the receiver hook. From this it will be seen that the instant a called subscriber removes his receiver, he can no longer be reached through the bell ringing device. As the bell ringing devices of the called and calling subscribers are in one and the same circuit, it will be evident that if the calling subscriber cannot ring the bell ringing device, of the one to whom he wishes to converse, it will be evident that he cannot ring his own. It will also be apparent that the talking circuit is at all times between the contact points 67 and the bell crank 66, that this connection is normally disengaged until operated or released by the bell ringer. From this it will be apparent that as the calling subscriber cannot operate his bell ringer when he moves his switch to a telephone that is busy, that this inability to operate his ringer prevents him from completing the talking circuit at his own telephone between 66 and 67. The bell crank 66 and contact point 67, together with the ringer Q, form what may be called a non-interfering device, which in this case, is purely mechanical, operated or brought into operation by an electrical device.

The operating circuit, which is the circuit that passes through the operating magnets A and B, is entirely confined within the central office and the currents therethrough do not consist of electrical impulses sent from distant sub-stations. In ordinary automatic telephone exchanges, when the battery circuit has passed over long distances, it is usually necessary, or at least advisable, to use copper wires between the telephones and the central station, which in long lines, means a considerable expense. By using a relay which may be operated by a very light current and then connecting said relay to a generator, and also arranging the generator so that the direction of current will be as required, I produce an arrangement by which the wires from the central office to the local stations may be made of iron instead of copper. Also by confining the operating circuits through the magnets A and B to the exchange, not permitting them at any time to connect to or pass over the lines connecting the central office with its local stations, I avoid the possibility of ever having a very heavy battery current pass to a talking circuit. By arranging the contact makers in pairs and by connecting the pairs of contact points by pairs of bank wires, and pairs of connections to the telephones, I am enabled to produce an entire and complete metallic circuit between two telephones, which does not at any time pass to ground or in any way connect with any line or branch which at any time is part of some other talking circuit.

It will be observed in tracing the talking circuit described, that there is a complete metallic circuit between the two telephones which are in telephonic communication and that this talking circuit has no branch or connection at any place to the operating circuit consisting of the battery X and the lines 50 and 100. It will also be observed that no part of the circuit at any point passes over a line which is or can be a common talking circuit between any other two telephones, as is ordinarily the case in telephone exchanges as heretofore made.

The arrangement of numbers on the keyboard or indicator, as illustrated in Fig. 1, is made for hundreds and any number of units up to 99, if desired. It is not necessary, however, that the division between units and hundreds be in this particular form. For example if the limit number of the telephones in the exchange is 625, there may be six graduations for hundreds and ninety-nine graduations for the units, in which case the greatest number of contacts made for any selection would be six plus ninety-nine, which is 105 contacts as the greatest number. There might, however, be ten graduations for the hundreds and sixty-three graduations in the units, in which case there would be, as the greatest number of contacts made ten plus sixty-three, equal seventy-three contacts. By making twenty-five graduations in the hundred and twenty-five graduations in the units, there would be also a combination of 625 telephones; but the greatest number of contacts made would be twenty-five plus twenty-five, equal fifty. It will be understood that the number of graduations indicated by the hundred marks at the lower portion of the indicator represent the number of racks $H^5$ or pairs of contact makers P and $P^1$ and that the number of graduations on the slide M represent the number of pairs of contact points in one of the vertical pairs of rows of contact points marked T in Fig. 1.

What I claim is:

1. The combination with a switching mechanism, and two magnets for operating it, of a relay and electrical connections for closing an electric circuit through either magnet according to the direction in which electrical impulses flow through said relay, a generator provided with a crank by the turning of which electrical impulses are sent through said relay, and automatically operating means for reversing the direction of the current when a predetermined number of impulses have been sent in one direction.

2. In a telephone exchange, the combination with electrically operated devices and two magnets therefor, of a relay adapted to close a circuit for either magnet according to the direction in which impulses flow through said relay, a generator provided with means by which electrical impulses are sent through said relay, and automatically operating means for reversing the direction of the current when a predetermined number of impulses have been sent in one direction.

3. The combination with electrically operated devices and two magnets therefor, of a relay adapted to close a circuit for either magnet according to the direction in which impulses flow through said relay, a generator provided with means by which electrical impulses are sent through said relay, and automatically operating means for reversing the direction of the current when a predetermined number of impulses have been sent in one direction and for stopping the impulses through the relay when a predetermined number of impulses have been sent in the reversed direction.

4. The combination with a switching mechanism and electrical devices for operating it, of a relay for controlling such operation, a generator, means for sending from said generator a series of electrical impulses in one direction and a second series in an opposite direction through said relay, and automatically operating means for dividing the two series in any desired proportion and extent from a larger and continuous series.

5. The combination with a switching mechanism and two magnets for operating it, of a relay and electrical connections for closing an electrical circuit through either magnet according to the direction in which electrical impulses flow through said relay, a generator and connections for sending impulses through said relay, a crank for operating said generator, an adjustable indicator for controlling the impulses sent by said generator, and means for operating said indicator by the movement of said generator.

6. The combination with a switching mechanism and magnets for operating it, of a generator and connections for sending electrical impulses for controlling said magnets, a crank for operating said generator, an adjustable indicator for controlling the impulses sent by said generator, and means for operating said indicator by the movement of said generator.

7. The combination with two magnets, a relay arranged to close an electric circuit through either magnet, and a bell ringing device, of a generator arranged to send a continuous series of electrical impulses of a like character, and an adjustable indicator provided with devices for controlling said impulses so as to cause successive operation of the two magnets and the bell ringing device.

8. The combination with a switching mechanism, two magnets for operating the switching mechanism, and a signaling device, of a generator provided with means for sending a series of impulses for causing the operation of said magnets and said signaling device, and automatically operating means for dividing such series of impulses so as to apportion any desired number of them to each magnet and the remainder to the signaling device.

9. The combination with two magnets, a relay arranged to close an electric circuit through either magnet, and a bell ringing device, of a generator arranged to send a continuous series of electrical impulses of a like character, and an adjustable indicator provided with devices for controlling said impulses so as to cause successive operation of the two magnets and the bell ringing device.

10. The combination with two or more electrically operated devices, and a generator arranged to send a series of impulses for controlling or operating said devices, of mechanism for controlling the distribution of said impulses to the said devices, and means for operating said mechanism by the movement of said generator.

11. In an automatic telephone exchange, the combination with a series of switches and a subscriber's station connected to each switch, of a selecting device and a bell ringing device located at each station, a generator provided with a crank and operatively connected to the selecting device, means for operating the selecting device by the movement of the generator so as to move its connected switch to electrical connection with any other station in the exchange and to operate the bell ringing device of the selected station, and a controlling device connected to the selecting device and so arranged that upon turning the generator crank, the connected switch will be automatically given the required number and kind of movements and the bell ringing device of the selected station will be automatically operated.

12. In a telephone exchange, the combination with a series of switches, means for operating them, and a subscriber's telephone station connected to each switch, of an indicator located at each station, an electrical generator connected to each indicator and provided with a crank by which it is operated, and means whereby upon turning the crank of said generator, the connected indicator will automatically control the number and kind of movements given to the connected switch so as to select the required station and will also automatically cause an alarm to be sounded at the required station as soon as the moved switch reaches the required connection.

13. The combination with a series of switching mechanisms located at a central office, a corresponding series of local stations, and a telephone circuit extending from each station to its switching mechanism, of a telephone set at each station normally disconnected from its telephone circuit, a magnet at each station for connecting its telephone set to its telephone circuit, and means controlled from each station and operating through its switching mechanism for establishing connections to a selected station and for operating the connecting magnet located thereat.

14. The combination with a series of telephone stations, and a pair of wires extending to each station over which pair of wires a telephonic connection may be completed between the station thereon and any of the other stations, of a telephone set at each station provided with a normally open connection to the wires running to the station, said open connection being separate from all connections operated by removing the receiver from its support, a magnet at each station, means by which an impulse sent to the magnet of a distant station will cause that magnet to complete the telephonic connection for that station, and means by which such impulse may be sent to the magnet of a selected one of said stations to the exclusion of stations not selected.

15. The combination with a series of telephone stations, a telephone set at each station, and a magnet at each station by the operation of which the station is placed in telephonic connection with any one of the other stations, of selective devices arranged to be moved to a series of successive positions, and means by which upon operating the selective devices impulses may be sent through the magnets of two stations to the exclusion of the magnets of the other stations whereby the two stations are placed in telephonic connection with each other.

16. The combination with a telephone station, a telephone set thereat, and two metallic line limbs extending to the station, of a magnet at the station and provided with a ground connection, selective devices arranged to be moved to a series of successive positions so as to make electrical connections to any one of a series of such magnets, and means by which upon sending an impulse through the selected magnet by way of the ground connection and one of the line limbs the telephone set will be placed in telephonic connection with the two metallic line limbs.

17. The combination with the stations of a telephone exchange, a telephone set at each station, and two metallic line limbs extending to each station, of a magnet at each station, each magnet being provided with a ground connection, step-by-step selective devices arranged to be moved to successive positions so as to select anyone of a series of such magnets, means by which upon operating the selected magnet the associated telephone set will be placed in telephonic connection with the metallic line limbs running to the station, and means by which impulses may be sent through the magnets of two of said stations by way of their ground connection and one line limb without sending them through other stations whereby such two stations are placed in telephonic connection with each other.

18. The combination with a series of telephone stations, two conductors leading into each station, and a telephone set at each station, of a magnet at each station arranged to connect the associated telephone set in bridge of said conductors, an incomplete circuit for each magnet including a ground connection and one of the conductors leading to its station, a source of electricity, and electrically operated devices arranged to be moved step-by-step to complete the circuits for two of said magnets to said source so as to cause the operation of said magnets and thereby place the stations at which they are located in telephonic connection with each other.

19. In a telephone exchange, the combination with the subscriber's telephone stations, of a selecting device and a bell ringing device at each station, incomplete telephonic connections connecting the stations together, means by which an operation of the selecting device of any one station will serve to complete electrical connections from the bell ringing device of that station to the bell ringing device of any other desired station, and means by which the operation of the bell ringing devices of the called and calling stations will serve to automatically connect the two stations telephonically together.

20. In a telephone exchange, the combination with a series of switching mechanisms located at a central office, and a local station connected to each switching mechanism, of a signaling device at each station, means by which a calling subscriber at one of said stations can operate the connected switching mechanism so as to place his own signaling device in a circuit with the signaling device of any other station, and means whereby upon the calling subscriber operating the connected signaling devices the stations at which they are located will be automatically placed in telephonic connection with each other.

21. In an automatic telephone exchange, the combination with the subscriber's telephone stations thereof, of a crank and a signaling apparatus located at each station, and means whereby upon giving said crank a continuous series of rotations, any required station in the exchange will be automatically selected and the subscriber at the selected station will be automatically signaled.

22. In an automatic telephone exchange, the combination with the subscriber's telephone stations thereof, and a normally stationary crank at each station, of means whereby the selection by a subscriber at any one station of any other station in the exchange is automatically controlled from a continuous rotation of his crank by the subscriber thereat.

23. In an automatic telephone exchange, the combination with the subscriber's telephone stations thereof, of a normally stationary crank at each station adapted to be manually operated and automatically operating means by which upon giving said crank of any station a continuous series of rotations of indeterminate extent, a desired and predetermined station will be placed in telephonic connection with the station at which the crank was operated.

24. The combination with a series of telephone stations, of a normally stationary crank at each station adapted to be manually operated, automatically operating means whereby a continuous series of rotations of any one crank will cause the station at which the rotated crank is located to be telephonically connected to a desired one of the other stations, and means for preventing such connection being made to a station at the time in telephonic connection with some third station.

25. The combination with a series of telephone stations, of a normally stationary crank and a signaling apparatus at each station, means whereby upon giving the crank of any station a continuous series of rotations of indeterminate length any required station in the exchange will be automatically selected and signaled, and means by which the selected station will not be signaled when it is in a previously established connection to some other station.

26. The combination with a switching mechanism, electrically operated devices for moving it, and a series of signaling devices, of a normally stationary crank adapted to be manually operated, and means whereby upon giving said crank a continuous series of rotations of indefinite number, a corresponding series of impulses will be sent to first operate said switching mechanism so as to cause the selection of a desired signaling device and then to operate the selected signaling device.

27. The combination with a switching mechanism, electrically operated devices for moving it, and a series of signaling devices, of a normally stationary crank and devices operated thereby, electrical connections connecting the crank operated devices with the switching mechanism and the switching mechanism with the different signaling devices, means whereby a series of rotations given to said crank will cause a series of electrical impulses to be sent over said connections, and means whereby a long and continuous series of such impulses will be automatically divided so as to first operate said switching mechanism to cause the selection of a desired signaling device and then to operate the selected signaling device.

28. In an automatic telephone exchange, the combination with the subscriber's telephone stations thereof, a generator at each station, and means whereby a series of impulses greater than needed sent from the generator of any one station will be automatically controlled so as to select any desired one of the other stations, of means for preventing connections being made to a station in use, and means for automatically indicating to the subscriber at the calling station that such connection has not been made.

29. A switching mechanism forming part of a telephone exchange, magnets and a battery for operating said switching mechanism, a relay for controlling such operation, a subscriber's telephone station connected to the switching mechanism, a magneto-generator located at the station and arranged to control said relay, a receiver hook, and connections from said hook to said generator so that a descent of said hook will operate said generator so as to cause two electrical impulses to flow through said relay in opposite directions.

30. A switching mechanism and electrical devices for controlling its operation, a receiver hook and a generator provided with connections to each other, and means whereby a descent of said receiver hook will cause electrical impulses to flow from said generator successively in opposite directions through said electrical devices.

31. A series of switching mechanisms and electrical devices for controlling their operations, electrical connections from one of said electrical devices to a telephone station, a receiver hook and a generator provided with connections to each other and located at such station, and means whereby a descent of said receiver hook will cause electrical impulses to flow from said generator successively in opposite directions through said electrical devices and the connections thereto.

32. A switching mechanism and electrical devices for controlling its operation, electrical connections extending from said devices to a local telephone station, a magneto generator adapted to send electrical impulses over said connections and through said devices, a crank and a receiver hook, each of which is adapted to operate said generator, means by which an operation of said generator by said crank will cause said switching mechanism to be moved from its normal position to any desired position, and means by which an operation of said generator by said receiver hook will cause said switching mechanism to be returned to its normal position.

33. The combination with a series of telephone stations, a switching mechanism for each station, electrical conductors connecting each station to its switching mechanism, and other electrical conductors inter-connecting the switching mechanisms, of a selecting device at each station, each selecting device comprising a generator arranged to send a series of impulses to the associated switching mechanism, and a manually adjustable indicator arranged to automatically control the distribution of a continuous series of impulses sent by said generator.

34. The combination with a series of telephone stations, and means for establishing a talking circuit between any two of them, of a contact closing device for the talking circuit, a receiver hook, a bell ringing device, and a generator, said parts being so arranged that upon impulses being sent from said generator, said bell ringing device will close said contact closing device while a descent of the receiver hook will open said contact closing device.

35. The combination with a series of telephone stations, electrical devices thereat, and conductors connecting the stations together, of a call mechanism providing a series of holes indicating stations to be selected, a station indicating pin adapted to be inserted in any one of said holes, means whereby upon inserting said pin in one of said holes and operating said mechanism an electrical contact will be made causing an operation of the electrical device at the station indicated by the hole in which the pin was inserted, and means by which the operation of said electrical device will connect said station into a talking circuit.

36. The combination with a series of telephone receivers each located at a different station, of a magnet for each receiver by the operation of which the associated receiver is placed in a telephonic connection, selective mechanism arranged to be moved step by step to make individual electrical connections to said magnets in succession, and means by which an impulse is sent through a desired one of said magnets at the time connection is completed thereto by said selective mechanism.

Signed at Junction City Kansas this 23 day of May 1900.

N. EMEL NORSTROM.

Witnesses:
H. H. MEAD,
HENRY H. MEAD, Jr.